United States Patent [19]

Alty

[11] Patent Number: 4,693,127

[45] Date of Patent: Sep. 15, 1987

[54] DUAL CAM WINDOW REGULATOR APPARATUS AND METHOD

[75] Inventor: Mark C. Alty, Dayton, Ohio

[73] Assignee: General Motors Corporation, Detroit, Mich.

[21] Appl. No.: 877,644

[22] Filed: Jun. 23, 1986

[51] Int. Cl.[4] .................... F16H 25/12; E05F 11/48

[52] U.S. Cl. .................... 74/25; 74/53; 49/352

[58] Field of Search .................... 49/352, 374, 138; 74/25, 37, 45, 53, 54, 55

[56] References Cited

U.S. PATENT DOCUMENTS

| | | | |
|---|---|---|---|
| 2,595,580 | 5/1952 | Hill | 74/45 X |
| 4,081,926 | 4/1978 | Jardin | 49/352 X |
| 4,241,542 | 12/1980 | Podolan et al. | 49/352 |
| 4,253,277 | 3/1981 | Campbell et al. | 49/352 |
| 4,480,409 | 11/1984 | Hara | 49/352 |
| 4,483,100 | 11/1984 | Blankenburg et al. | 49/352 |
| 4,589,227 | 5/1986 | Bickerstaff | 49/352 X |

*Primary Examiner*—George H. Krizmanich
*Attorney, Agent, or Firm*—Ernest E. Helms

[57] ABSTRACT

A cable or tape window regulator apparatus and method is provided with a dual camming action. The dual camming action allows the glass to have relative movement with respect to the drive member of the window regulator. Therefore, the glass will have a total vertical travel which is greater than the vertical travel of the cable or tape.

15 Claims, 5 Drawing Figures

DUAL CAM WINDOW REGULATOR APPARATUS AND METHOD

FIELD OF THE PRESENT INVENTION

The field of the present invention is that of vehicle window regulators. More particularly, the field of the present invention is that of cable and tape drive vehicle window regulators.

DISCLOSURE STATEMENT

The two major types of window regulators which utilize a flexible drive member are the cable window regulator and the tape drive window regulator. Both of the cable and tape drive window regulators have a guide structure to determine the orientation of the drive member. The glass is fixably or slidably connected with the drive member. Both types of window regulators are also provided with a manually or artifically powered winding mechanism for imparting linear motion to the drive member.

Looking at a conventional cable door window regulator in greater detail, the cable regulator guide structure is a generally vertically orientated channel. At the opposite ends of the channel, rotatably mounted thereon are cable idler pulleys. The idler pulleys direct the cable to and from the channel to the winding mechanism.

Cable-type window regulators are advantageous over some forms of window regulators due to their relative compactness and light weight. However, in many applications the above considerations are overcome by other factors. One factor which diminishes the possible use of cable regulators is their reliability problems due to potential cable breakage. Cable breakage in cable regulators is due largely to the cyclical bending loads which are applied to the cable during its operation as it traverses over the idler pulleys at the opposite ends of the channel. To minimize the bending forces it is desirable to have idler pulleys with the largest diameter possible. The diameter of the idler pulleys largely determines the operational life of the cable. However, the idler pulley's diameter is largely a function of the desired maximum vertical travel of the glass window plus the vertical envelope of the vehicle door. When the idler pulley's diameter is increased within a fixed vertical envelope of door, the vertical travel of the cable regulator system is decreased.

It is often desirable to have a 2/1 ratio of the vertical height of the vehicle door to the vertical height of the door window glass when the window is in the raised closed position. One way the above ratio was achieved prior to the present invention was to have the window glass at its lowermost position extend slightly above the vehicle door panel. The above arrangement is sometimes uncomfortable when the occupant rests his or her arm across the top of the door panel over the thin edge of the extended glass. Therefore, it is desirable to design a window regulator system wherein the travel of the window glass is maximized so that at its lowermost position the window glass may be retained below the level of the door panel. However the window glass in its uppermost position must seal the window opening while at the same time approach the 2/1 ratio of door height to window glass height.

The above design criteria are difficult to accomplish when utilizing a cable regulating system when it is desirable to keep the idler pulleys diameters as large as possible in order to provide maximum cable operational life. As previously mentioned, an increased pulley idler diameter decreases the maximumm window glass vertical travel.

SUMMARY OF INVENTION

To overcome the above-noted and other problems in tape drive and cable window regulators, the present invention is brought forth. The present invention provides an apparatus and method of utilization of a tape drive or cable-type vehicle window regulator which provides dual camming action. The dual camming action of the inventive window regulator provides the window glass with a vertical travel which is greater than the vertical travel experienced by the drive member.

In its preferred embodiment the present invention provides a window regulator with a channel guide structure. Fixably attached to the drive member is a glass plate retainer. The glass plate retainer has slidably mounted thereto in the preferred embodiment a glass plate. The glass plate in the preferred embodinent is a separate plate fixably or slidably connected with the glass window pane. The glass plate also has a cammed surface which engages a first lever which is pivotally attached with the glass plate retainer. The first lever is, in turn, operatively connected with a second lever.

The second lever engages with a second cam plate to determine its angular position. The movement of the second lever causes the first lever to pivot, causing relative motion between the glass plate retainer and the glass plate. The pivoting of the first lever causes the window glass to have relative vertical motion with respect to the drive member thereby increasing the vertical travel of the glass window.

The present invention is advantageous over the prior art in that it allows greater vertical window glass travel while having the same fixed drive member vertical travel. Or, when utilizing a cable window regulator, the diameter of the cable idler pulleys may be increased and the vertical cable travel be decreased, while maintaining the same vertical travel of the window, It is an object of the present invention to provide a vehicle window regulator with dual camming action. It is another object of the present invention to provide a cable window regulator wherein the idler pulleys may be increased in diameter without diminishing the vertical travel of the window glass regulated. It is yet another object of the present invention to provide a cable or tape drive vehicle window regulator wherein the window glass has a greater vertical travel than that experienced by the drive member. It is another object of the present invention to provide a method of regulating a vehicle glass window utilizing a window regulator with dual camming action.

It is still another object of the present invention to provide a vehicle cable window regulator which includes a cable, a cable guide structure including a generally vertically orientated channel having a rotatably mounted cable idler pulley at the opposite ends of the channel, neans for imparting a reversible linear movement of the cable along the cable guide structure, a glass plate for attachement to the window having a first cam surface, a glass plate retainer fixably attached with the cable and slidably mounting the glass plate allowing relative motion between the cable and the glass plate, a first cam lever pivotally attached with the glass plate retainer for engagement with the first cam surface, a second cam lever operatively connected with the first lever and having a cam follower at one end, and a control cam plate with a slot for engagement with the second cam lever follower being affixed adjacent the lower end of the cable guide structure whereby the window is lifted at a variable rate with respect to the cable.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
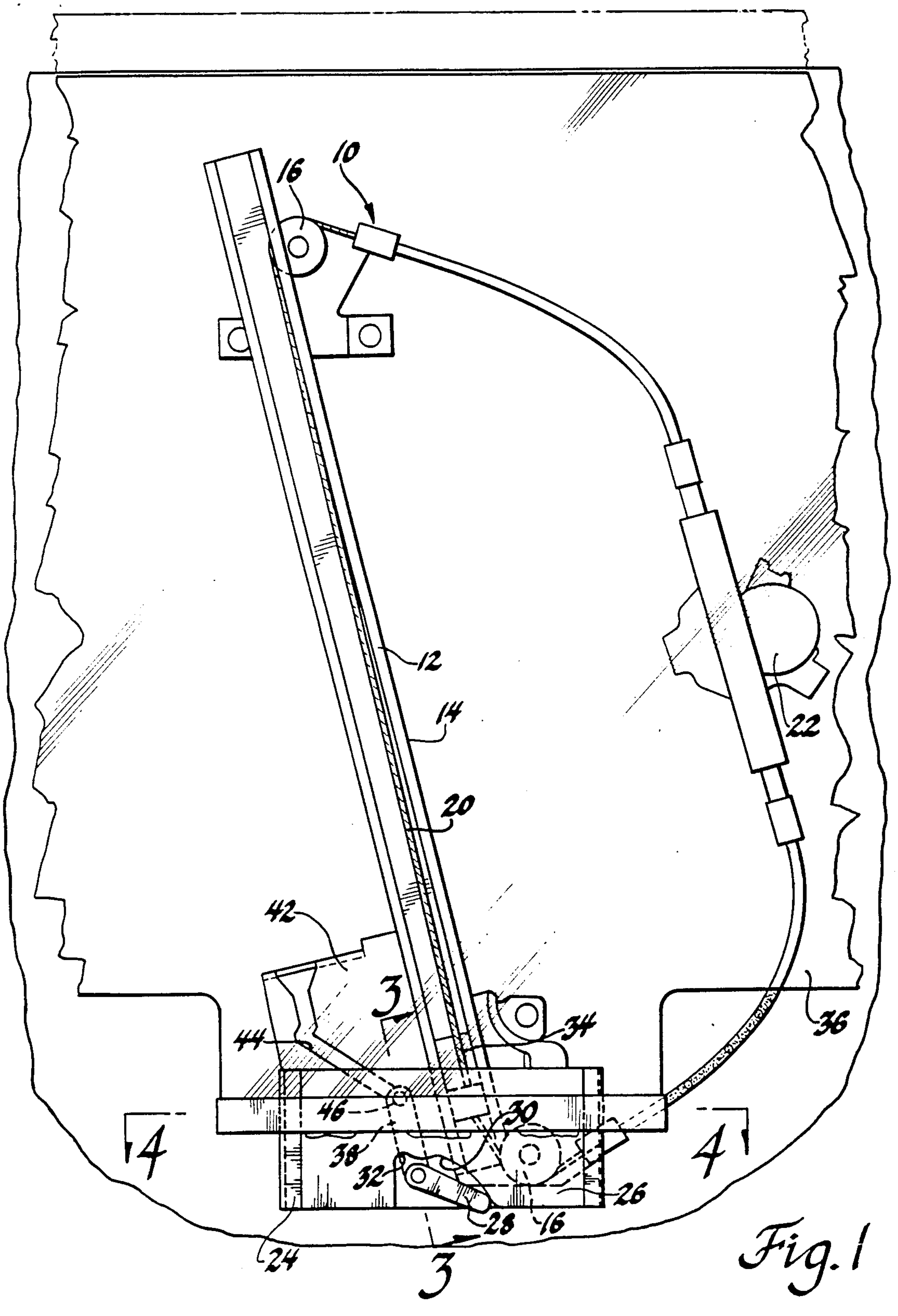
FIG. 1 is a front elevational view of a preferred embodiment of a cable-type window regulator of the present invention shown at the window's lowermost position.

Referring to FIGS. 1, 2, 3 and 4, the cable window regulator 10 of a preferred embodiment of the present invention has seven major elements. The first major element of the present invention is the cable guide structure 12. In its preferred embodiment, the cable guide structure is a generally vertically oriented channel member 14 which has rotatably mounted at its opposite ends cable idler pulleys 16. Stretching along the cable idler pulleys 16 is the second major element of this invention, the drive member cable 20. Thirdly to raise and lower the cable 20 linearly along the channel 14, there is provided a means for imparting a reversible linear movement of the drive member which is a manual or electric powered winder 22.

Fixably attached to the cable via a runner 34 is the fourth major element which is a first plate mounting means or glass plate retainer 24. The glass plate retainer 24 provides the means of mounting of the glass plate 26 to the cable 20 as will be later described.

Slidably mounted to allow relative motion between itself and the glass plate retainer 24, is a first plate or glass plate 26, the fifth major element of the present invention. The glass plate 26 is attached to the window pane 36 since guide structure 12 is at an incline, the glass plate 26 must have relative horizontal motion with windowpane 36. However, the glass plate 26 does not have relative vertical motion with windowpane 36.

The glass plate 26 has a first cam surface 30 along its lower edge. A first lever 28 pivotally mounted to the glass plate retainer 24 is provided for engagement with the first cam surface 30 of the glass plate 26. Rotation of the first lever 28 from the horizontal position to a vertical position will cause relative motion between the glass plate 26 and glass plate retainer 24. The above will occur with the upward motion of the cable 20. The glass plate cam surface 30 is also provided with a portion 32 which provides a negative cam ratio which locks the first lever in a raised position when raising the window 36. After locking, the relative position of the window glass 36 with respect to the cable 20 will be fixed. The locking of first lever 28 prevents the window glass 36 from sliding back down forcing the first lever 28 to its former horizontal orientation.

Operationally connected with the first lever 28 is a second lever 38, the sixth major element of the present invention. The second lever 38 controls the operational position of the first lever 28. To determine the orientation of the second lever 38, there is provided the seventh and last major element, a control cam plate 42. The control cam plate 42 has a fixed position with respect to the guide structure 12 and is typically welded thereto. The control cam plate 42 has a second cam surface formed by slot 44. Slot 44 captures a cam follower 46 at the end of the second lever 38. The position of the cam follower 46 within the slot 44 controls the angular orientation of the second lever 38 thereby controlling the angular orientation of the first lever 28.

Although there is no requirement to do so, as illustrated in FIGS. 1 through 4, the control cam plate 42 is placed on the opposite side of the channel 14 from the glass plate retainer 24.

When the glass is at its lowermost position (FIG. 1), the cam follower 46 is captured within the slot 44 of the control cam plate 42 causing the first lever 28 to be in a virtual horizontal position. As the cable 20 is linearly moved upwardly by winder 22, the path of the slot 44 causes the second lever 38 to rotate counterclockwise. Second lever 38 motion causes first lever 28 to rotate counterclockwise engaging glass plate cam surface 30. The counter- clockwise rotation of the first lever 28 causes the window 36 and glass plate 26 to move relative to the glass plate retainer 24 and cable 20.

Although not required, the control cam plate 42 is attached adjacent the lowermost end of the channel guide structure 12. Therefore, the dual camming: action occurs near the lower position of window 36 within the door. The camming action is totally unnoticed by the vehicle operator except for the fact that the window 36 raises at a variable (higher) rate at its lower position and thereby decreases speed as it continues to rise upwardly.

Figure 2:
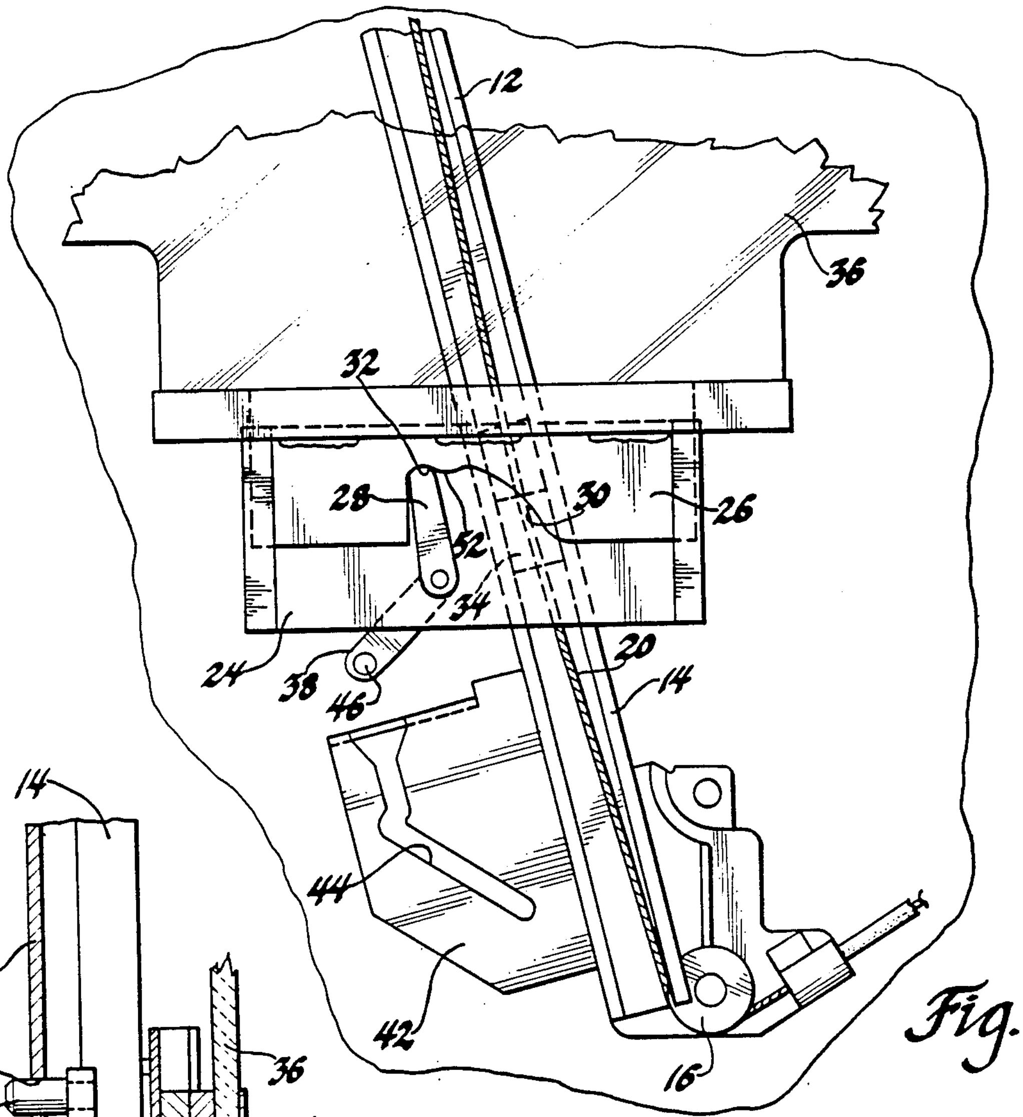
FIG. 2 is a front elevational view of the window regulator as illustrated in FIG. 1 in the intermediately raised position.
Figure 3:
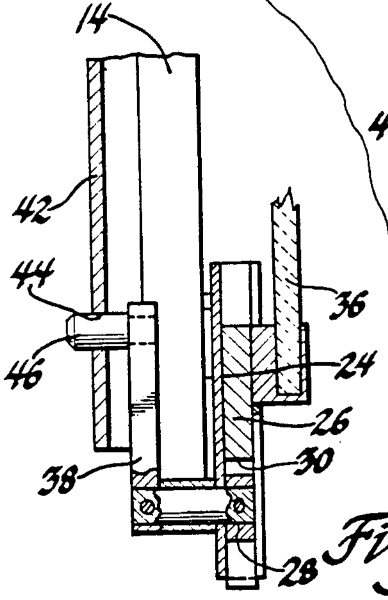
FIG. 3 is a sectional view of the window regulator illustrated in FIG. 1 taken along line 3—3.
Figure 4:
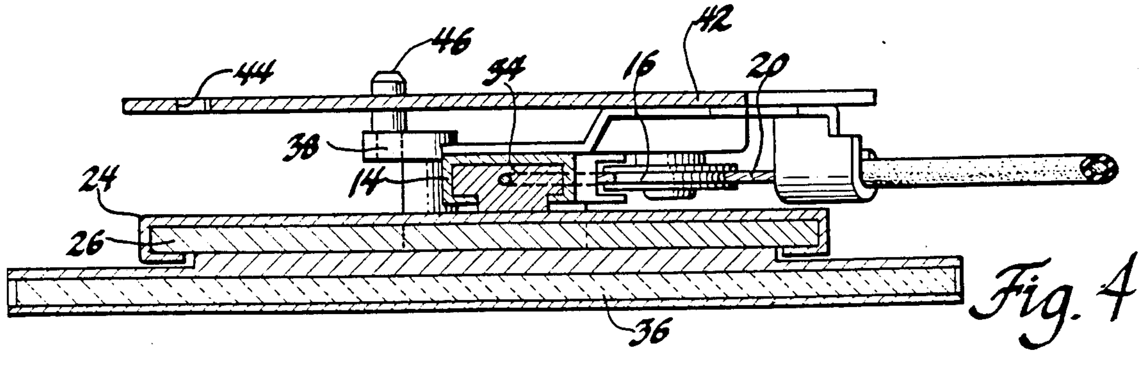
FIG. 4 is a sectional view of the window regulator illustrated in FIG. 1 taken along line 4—4.

As best shown in FIG. 2 when the second lever cam follower 46 leaves slot 44, the second lever 38 now will be fully at its most counterclockwise position. The above action by second lever 38 will cause first lever 28 to pass over locking curvature 52 of the glass plate first cam surface 30. The locking curvature 52 prevents the weight of the glass from forcing the first lever 28 clockwise as previously described. The locking action is required since the second lever follower 46 is no longer engaged within the slot 44 (FIG. 2).

Figure 5:
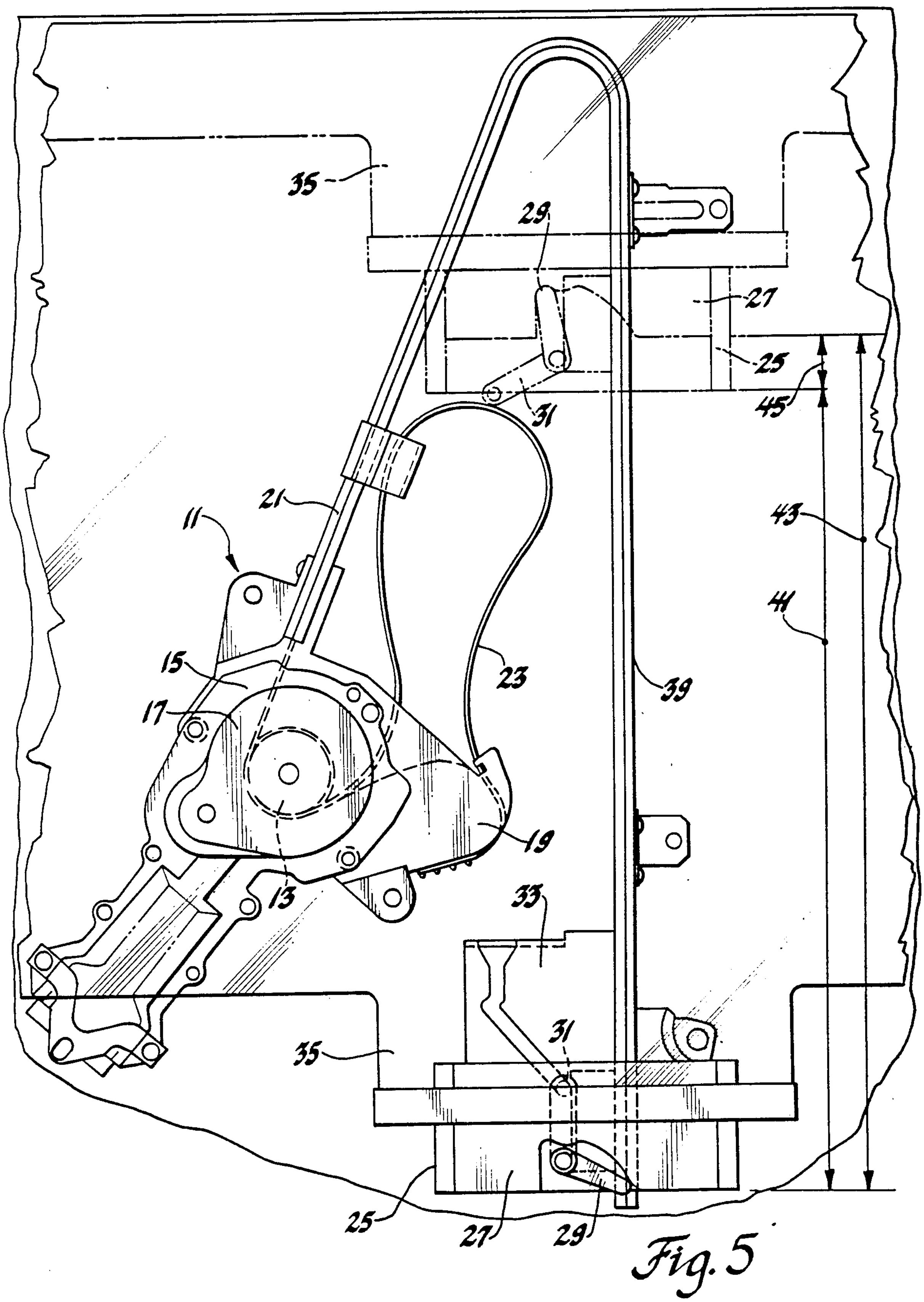
FIG. 5 is a front elevational view of a tape drive window regulator of the present invention shown in solid at the window's lowermost position and shown in phantom at the window's raised closed position.

FIG. 5 illustrates a preferred embodiment of a tape drive window regulator 11 of the present invention. Tape drive window regulator 11 has a sprocket wheel winder 13. A guide structure 15 is provided by a molded path 17 in a frame 19 and an attached U-shaped rail 21. The flexible drive tape 23 is a 2 by 10 mil plastic tape with a series of transverse slots (not shown). Attached to the tape 23 is a glass plate retainer 25. The remainder of the structure and function of glass plate 27 and first lever 29 and second lever 31 and control cam plate 33 are identical to that previously described for cable window regulator 20 except that the glass plate 27 does not have relative motion in a horizontal plate with the glass windowpane 35. Since generally vertically oriented rail member section 39 is not inclined like channel 14 of the cable window regulator 10, the glass plate 27 need not have horizontal relative motion with the windowpane 35.

Line 41 illustrates the vertical travel of tape 23 and line 43 illustrates the vertical travel of window 35. The differential 45 between lines 43 and 41 illustrates the increased vertical travel of window glass pane 35 provided by the dual camming action of the present invention.

The present invention provides method of regulating the vertical height of a vehicle window 36. The inventive method includes the following steps:

1. attaching the window 36 to a glass plate 26 having a first cam surface 30;
2. mounting the glass plate 26 to a glass plate retainer 24 to allow relative motion between the glass plate 26 and the glass plate retainer 24;
3. attaching the glass plate retainer 24 to a drive member 20;
4. engaging the first cam surface 30 with a first cam lever 28 pivotally connected with the glass plate retainer 24;
5. operationally connecting the first cam lever 28 with a second cam lever 38 which is engaged with a second cam surface 44;
6. guiding the drive member 20 in a structure 14 fixed with respect to the second cam surface 44;
7. linearly moving the drive member 20.

While a few embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle window regulator for regulating a window, said regulator comprising in combination:

a drive member;

a drive member guide structure;

means for imparting a reversible linear movement of said drive member along said guide structure;

a first plate for attachment to said window having a first cam surface;

a first plate mounting means attached to said drive member allowing relative motion between said drive menber and said first plate;

a first cam lever pivotally attached with said first plate mounting means for engagement with said first cam surface;

a second cam lever operatively connected with said first cam lever;

and a second cam surface for engagement with said second cam lever being fixed with respect to said drive member guide structure whereby the window is lifted at a variable rate with respect to said drive member.

2. A window regulator as described in claim 1 wherein said drive member is a cable.

3. A window regulator as described in claim 2 wherein said drive member is a flexible tape.

4. A window regulator as described in claim 1 wherein said first plate is slidably mounted to said first plate mounting means.

5. A window regulator as described in claim 1 wherein said first cam surface has a portion with a negative cam ratio locking said first cam lever to retain said window at a fixed position with respect to said drive member.

6. A window regulator as described in claim 1 wherein said second cam surface is provided by a second plate affixed to said guide structure.

7. A window regulator as described in claim 6 wherein said second cam plate has a slot and said second cam lever has attached thereto a follower which engages with the slot of said second cam plate.

8. A window regulator as described in claim 8 wherein said second cam plate is adjacent the lower end of said guide structure.

9. A vehicle cable window regulator for regulating a window, said regulator comprising in combination:

a cable;

a cable guide structure including a generally vertically orientated channel having a rotatably mounted cable idler pulley at the opposite ends of said channel;

means for imparting a reversible linear movement of said cable along said cable guide structure;

a glass plate for attachment to said window having a first cam surface;

a glass plate retainer attached with said cable and slidably mounting said glass plate allowing relative motion between said cable and said glass plate;

a first cam lever pivotally attached with said glass plate retainer for engagement with said first cam surface;

a second cam lever operatively connected with said first lever and having a cam follower at one end; and a control cam plate with a slot for engagement with said second cam lever follower being affixed adjacent the lower end of said cable guide structure whereby the window is lifted at a variable rate with respect to said cable.

10. A window regulator as described in claim 9 wherein said first cam surface has a portion with a negative cam ratio locking said first cam lever to retain said window at a fixed position with respect to said cable.

11. A vehicle tape drive window regulator for regulating a window, said regulator comprising in combination:

a flexible drive tape;

a drive tape guide structure including a generally vertically oriented rail;

means for imparting a reversible linear movement of said drive tape along said guide structure;

a glass plate for attachment to said window having a first cam surface;

a glass plate retainer attached with said drive tape and slidably mounting said glass plate allowing relative motion between said drive tape and said glass plate;

a first cam lever pivotally attached with said glass plate retainer for engagement with said first cam surface;

a second cam lever operatively connected with said first lever and having a cam follower at one end; and a control cam plate with a slot for engagement with said second cam lever follower being affixed adjacent the lower end of said rail whereby the window is lifted at a variable rate with respect to said drive tape.

12. A window regulator as described in claim 11 wherein said first cam surface has a portion with a negative cam ratio locking said first cam lever to retain said window at a fixed position with respect to said drive tape.

13. A method of regulating the vertical height of a vehicle window using a said method in combination comprising:

attaching the window to a glass plate having a first cam surface;

mounting said glass plate to a glass plate retainer to allow relative movement between said glass plate and said glass plate retainer;

attaching said glass plate retainer to a drive member;

engaging said first cam surface with a first cam lever pivotally connected with said glass plate retainer;

operatively connecting said first cam lever with a second cam lever which is engaged with a second cam surface;

guiding said drive member in a structure fixed with respect to said second cam surface; and linearly moving said drive member.

14. A method of regulating a vehicle window as described in claim 13 further including slidably mounting said window to said glass plate.

15. A method of regulating a vehicle window as described in claim 14 further including locking said first cam lever on a portion of said first cam surface to fix the position of said window with respect to said drive member.

* * * * *